(12) United States Patent
Kuchoor (10) Patent No.: US 10,713,070 B2
(45) Date of Patent: Jul. 14, 2020

(54) SYSTEMS AND METHODS FOR CAPTURING AND VISUALIZING USER INTERACTIONS ACROSS DEVICES

(71) Applicant: salesforce.com, inc., San Francisco, CA (US)

(72) Inventor: Santhosh Kumar Kuchoor, Dublin, CA (US)

(73) Assignee: salesforce.com, inc., San Francisco, CA (US)

( * ) Notice: Subject to any disclaimer, the term of this patent is extended or adjusted under 35 U.S.C. 154(b) by 132 days.

(21) Appl. No.: 15/876,578

(22) Filed: Jan. 22, 2018

(65) Prior Publication Data

US 2019/0227824 A1    Jul. 25, 2019

(51) Int. Cl.
| | | |
|---|---|---|
| *G06F 9/455* | (2018.01) | |
| *G06F 9/451* | (2018.01) | |
| *G06F 16/26* | (2019.01) | |
| *G06F 16/28* | (2019.01) | |

(52) U.S. Cl.
CPC .......... *G06F 9/45512* (2013.01); *G06F 9/451* (2018.02); *G06F 16/26* (2019.01); *G06F 16/283* (2019.01)

(58) Field of Classification Search
CPC ....... G06F 9/45512; G06F 9/451; G06F 16/26
See application file for complete search history.

(56) References Cited

U.S. PATENT DOCUMENTS

| | | | |
|---|---|---|---|
| 5,983,227 A | | 11/1999 | Nazem et al. |
| 6,167,533 A | * | 12/2000 | Potterveld ........... G06F 11/3013 714/25 |
| 6,216,133 B1 | | 4/2001 | Masthoff |
| 6,236,978 B1 | | 5/2001 | Tuzhilin |
| 6,288,717 B1 | | 9/2001 | Dunkle |
| 6,411,949 B1 | | 6/2002 | Schaffer |
| 6,907,566 B1 | | 6/2005 | McElfresh et al. |
| 7,062,502 B1 | | 6/2006 | Kesler |
| 7,100,111 B2 | | 8/2006 | McElfresh et al. |
| 7,139,978 B2 | * | 11/2006 | Rojewski ................ H04L 67/22 715/744 |
| 7,269,590 B2 | | 9/2007 | Hull et al. |
| 7,373,599 B2 | | 5/2008 | McElfresh et al. |
| 7,401,094 B1 | | 7/2008 | Kesler |
| 7,406,501 B2 | | 7/2008 | Szeto et al. |
| 7,454,509 B2 | | 11/2008 | Boulter et al. |
| 7,599,935 B2 | | 10/2009 | La Rotonda et al. |
| 7,603,331 B2 | | 10/2009 | Tuzhilin et al. |

(Continued)

OTHER PUBLICATIONS

Final Office Action for U.S. Appl. No. 12/437,418, dated Apr. 16, 2012.

(Continued)

*Primary Examiner* — Ryan Barrett
(74) *Attorney, Agent, or Firm* — LKGlobal | Lorenz & Kopf, LLP (57) ABSTRACT

Systems and methods are disclosed for providing visualizations across devices of user interactions with a data analytics service. User interactions with a data analytics user interface on a first device are detected. Device agnostic commands are generated for performing the user interactions on a second device. The device agnostic commands are transmitted to a second device for replicating the user interactions on the second device.

18 Claims, 9 Drawing Sheets

(56) References Cited

U.S. PATENT DOCUMENTS

| | | | |
|---|---|---|---|
| 7,644,122 B2 | 1/2010 | Weyer et al. | |
| 7,668,861 B2 | 2/2010 | Steven | |
| 7,747,648 B1 | 6/2010 | Kraft et al. | |
| 7,827,208 B2 | 11/2010 | Bosworth et al. | |
| 7,853,881 B1 | 12/2010 | Aly Assal et al. | |
| 7,856,445 B2 | 12/2010 | Gross | |
| 7,945,653 B2 | 5/2011 | Zuckerberg et al. | |
| 7,991,764 B2 | 8/2011 | Rathod | |
| 8,005,896 B2 | 8/2011 | Cheah | |
| 8,073,850 B1 | 12/2011 | Hubbard et al. | |
| 8,103,611 B2 | 1/2012 | Tuzhilin et al. | |
| 8,150,913 B2 | 4/2012 | Cheah | |
| 8,166,013 B2 | 4/2012 | Bandaru et al. | |
| 8,353,012 B2 * | 1/2013 | Del Real | G06F 21/6218 705/326 |
| 8,566,648 B2 * | 10/2013 | Schroeder | G06F 11/3672 714/38.14 |
| 9,459,780 B1 * | 10/2016 | Smith | G06F 9/453 |
| 9,766,769 B1 * | 9/2017 | Webber | G06F 3/0481 |
| 10,083,159 B1 * | 9/2018 | Bekmambetov | G06F 17/24 |
| 2008/0010270 A1 | 1/2008 | Gross | |
| 2008/0147487 A1 | 6/2008 | Hirshberg | |
| 2008/0209320 A1 | 8/2008 | Mawhinney et al. | |
| 2010/0125502 A1 | 5/2010 | Solomon et al. | |
| 2010/0138295 A1 * | 6/2010 | Caron | G06Q 30/02 705/14.49 |
| 2010/0217757 A1 | 8/2010 | Fujioka | |
| 2010/0241576 A1 | 9/2010 | Beeri | |
| 2011/0209067 A1 | 8/2011 | Bogess et al. | |
| 2011/0246879 A1 * | 10/2011 | White | G06F 16/958 715/704 |
| 2011/0258204 A1 | 10/2011 | Hubbard et al. | |
| 2012/0290407 A1 | 11/2012 | Hubbard et al. | |
| 2013/0097706 A1 * | 4/2013 | Titonis | G06F 21/56 726/24 |
| 2013/0227350 A1 * | 8/2013 | O'Riordan | G06F 11/3476 714/45 |
| 2014/0108911 A1 * | 4/2014 | Damale | H04L 67/22 715/234 |
| 2015/0033149 A1 * | 1/2015 | Kuchoor | G06F 17/241 715/753 |
| 2015/0160951 A1 * | 6/2015 | Iyengar | H04L 67/34 715/712 |
| 2015/0346855 A1 * | 12/2015 | Momchilov | G06F 3/038 345/173 |
| 2016/0182627 A1 * | 6/2016 | Navanageri | H04L 67/1095 709/219 |
| 2017/0075786 A1 * | 3/2017 | Ekambaram | G06F 11/3608 |
| 2018/0253224 A1 * | 9/2018 | Fransen | G06F 3/04883 |

OTHER PUBLICATIONS

Final Office Action for U.S. Appl. No. 12/356,429, dated May 2, 2012.

Notice of Allowance for U.S. Appl. No. 12/819,402, dated May 14, 2012.

Non-Final Office Action for U.S. Appl. No. 13/453,802, dated Jun. 8, 2012.

\* cited by examiner

SYSTEMS AND METHODS FOR CAPTURING AND VISUALIZING USER INTERACTIONS ACROSS DEVICES

TECHNICAL FIELD

This disclosure relates to user interactions with computing devices and more particularly to capturing and visually replicating user interactions across devices.

BACKGROUND

The advent of powerful servers, large-scale data storage and other information infrastructure has spurred the development of data analytics applications. Structured query language (SQL) engines, on-line analytical processing (OLAP) databases and inexpensive large disk arrays have for instance been harnessed to capture and analyze vast amounts of data.

Data analytics applications can provide many features. These can include analyzing data sets for patterns and trends. For example, sales managers can track year-over-year business performance as well as generate forecast metrics to identify behaviors that drive sales. Dashboards can be created to help visualize the results from a data analytics application. Such data analysis visualizations, however, can become problematic if, for example, the user is relatively inexperienced in operating the data analytics application or has to repeat the same or similar data analytic operations upon different data sets. This can become labor intensive and susceptible to user error when performing the same or similar data analysis operations on different data sets.

BRIEF DESCRIPTION OF THE DRAWINGS

The present invention will be understood more fully from the detailed description given below and from the accompanying drawings of various embodiments of the present invention, which, however, should not be taken to limit the present invention to the specific embodiments, but are for explanation and understanding only.

DETAILED DESCRIPTION

The subject matter described herein discloses apparatuses, systems, techniques and articles that provide user access to data analytics services, such as for visualizing data analytics across multiple devices. In some examples, apparatuses, systems, techniques and articles disclosed herein capture user interactions being performed on a data analytics interface and transmitting them to other devices in a device agnostic manner.

Figure 1:
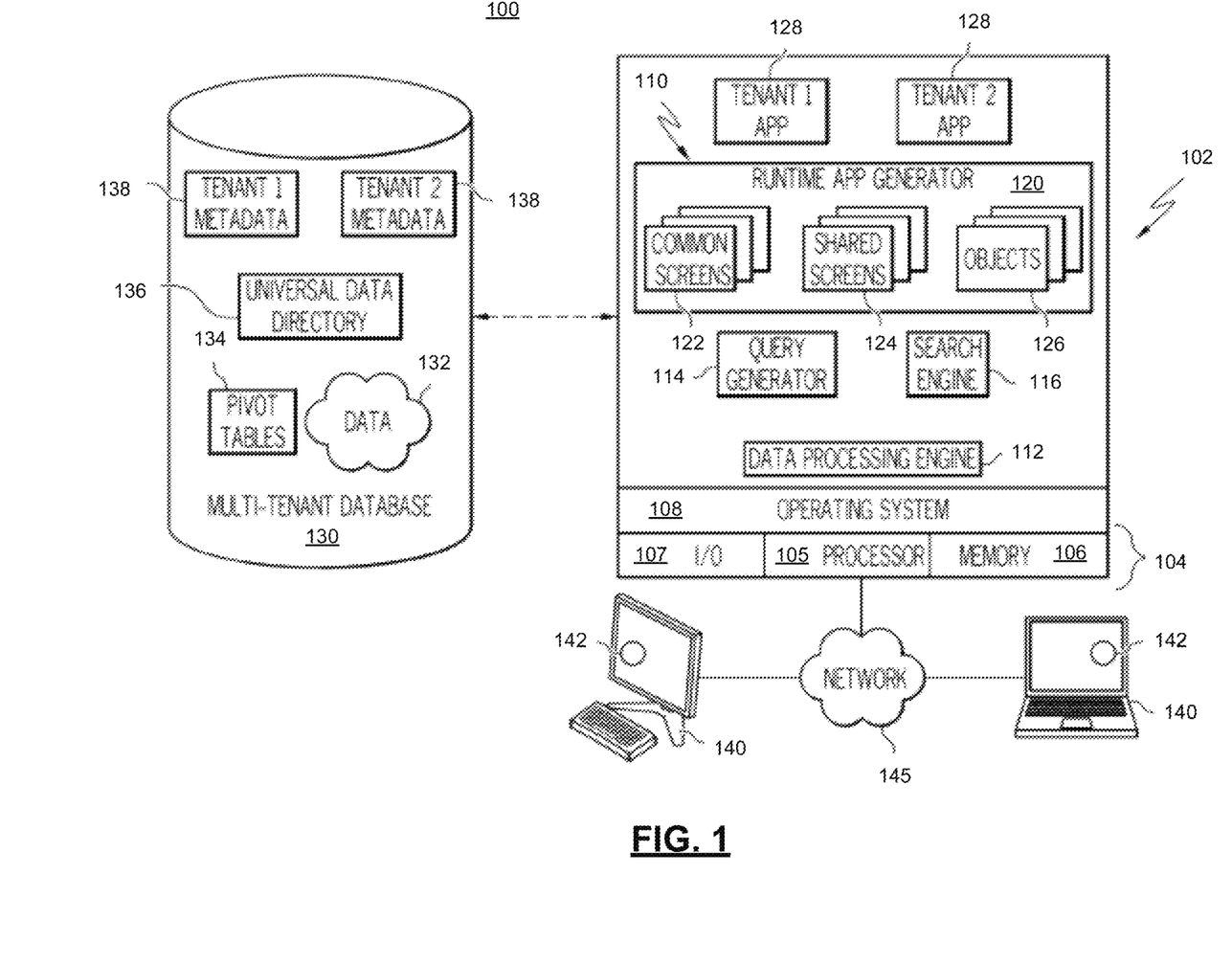
FIG. 1 is a block diagram depicting an exemplary embodiment of an on-demand multi-tenant database system.

FIG. 1 and the following discussion are intended to provide a brief, general description of one non-limiting example of an example environment in which the embodiments described herein may be implemented. Those of ordinary skill in the art will appreciate that the embodiments described herein may be practiced with other computing environments.

FIG. 1 depicts an exemplary embodiment of an on-demand multi-tenant database system 100. The illustrated multi-tenant system 100 of FIG. 1 includes a server 102 that dynamically creates and supports virtual applications 128 based upon data 132 from a common database 130 that is shared between multiple tenants, alternatively referred to herein as a multi-tenant database. Data and services generated by the virtual applications 128 are provided via a network 145 to any number of client devices 140, as desired. Each virtual application 128 is suitably generated at run-time (or on-demand) using a common application platform 110 that securely provides access to the data 132 in the database 130 for each of the various tenants subscribing to the multi-tenant system 100. In accordance with one non-limiting example, the multi-tenant system 100 is implemented in the form of an on-demand multi-tenant customer relationship management (CRM) system that can support any number of authenticated users of multiple tenants.

As used herein, a "tenant" or an "organization" should be understood as referring to a group of one or more users or entities that shares access to common subset of the data within the multi-tenant database 130. In this regard, each tenant includes one or more users associated with, assigned to, or otherwise belonging to that respective tenant. To put it another way, each respective user within the multi-tenant system 100 is associated with, assigned to, or otherwise belongs to a particular tenant of the plurality of tenants supported by the multi-tenant system 100. Tenants may represent customers, customer departments, business or legal organizations, and/or any other entities that maintain data for particular sets of users within the multi-tenant system 100 (i.e., in the multi-tenant database 130). For example, the application server 102 may be associated with one or more tenants supported by the multi-tenant system 100. Although multiple tenants may share access to the server 102 and the database 130, the particular data and services provided from the server 102 to each tenant can be securely isolated from those provided to other tenants (e.g., by restricting other tenants from accessing a particular tenant's data using that tenant's unique organization identifier as a filtering criterion). The multi-tenant architecture therefore allows different sets of users to share functionality and hardware resources without necessarily sharing any of the data 132 belonging to or otherwise associated with other tenants.

The multi-tenant database 130 is any sort of repository or other data storage system capable of storing and managing the data 132 associated with any number of tenants. The database 130 may be implemented using any type of conventional database server hardware. In various embodiments, the database 130 shares processing hardware 104 with the server 102. In other embodiments, the database 130 is implemented using separate physical and/or virtual database server hardware that communicates with the server 102 to perform the various functions described herein. In an exemplary embodiment, the database 130 includes a database management system or other equivalent software capable of determining an optimal query plan for retrieving and providing a particular subset of the data 132 to an instance of virtual application 128 in response to a query initiated or otherwise provided by a virtual application 128. The multi-tenant database 130 may alternatively be referred to herein as an on-demand database, in that the multi-tenant database 130 provides (or is available to provide) data at run-time to on-demand virtual applications 128 generated by the application platform 110.

In practice, the data 132 may be organized and formatted in any manner to support the application platform 110. In various embodiments, the data 132 is suitably organized into a relatively small number of large data tables to maintain a semi-amorphous "heap"-type format. The data 132 can then be organized as needed for a particular virtual application 128. In various embodiments, conventional data relationships are established using any number of pivot tables 134 that establish indexing, uniqueness, relationships between entities, and/or other aspects of conventional database organization as desired. Further data manipulation and report formatting is generally performed at run-time using a variety of metadata constructs. Metadata within a universal data directory (UDD) 136, for example, can be used to describe any number of forms, reports, workflows, user access privileges, business logic and other constructs that are common to multiple tenants. Tenant-specific formatting, functions and other constructs may be maintained as tenant-specific metadata 138 for each tenant, as desired. Rather than forcing the data 132 into an inflexible global structure that is common to all tenants and applications, the database 130 is organized to be relatively amorphous, with the pivot tables 134 and the metadata 138 providing additional structure on an as-needed basis. To that end, the application platform 110 suitably uses the pivot tables 134 and/or the metadata 138 to generate "virtual" components of the virtual applications 128 to logically obtain, process, and present the relatively amorphous data 132 from the database 130.

The server 102 is implemented using one or more actual and/or virtual computing systems that collectively provide the dynamic application platform 110 for generating the virtual applications 128. For example, the server 102 may be implemented using a cluster of actual and/or virtual servers operating in conjunction with each other, typically in association with conventional network communications, cluster management, load balancing and other features as appropriate. The server 102 operates with any sort of conventional processing hardware 104, such as a processor 105, memory 106, input/output features 107 and the like. The input/output features 107 generally represent the interface(s) to networks (e.g., to the network 145, or any other local area, wide area or other network), mass storage, display devices, data entry devices and/or the like. The processor 105 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 106 represents any non-transitory short or long term storage or other computer-readable media capable of storing programming instructions for execution on the processor 105, including any sort of random access memory (RAM), read only memory (ROM), flash memory, magnetic or optical mass storage, and/or the like. The computer-executable programming instructions, when read and executed by the server 102 and/or processor 105, cause the server 102 and/or processor 105 to create, generate, or otherwise facilitate the application platform 110 and/or virtual applications 128 and perform one or more additional tasks, operations, functions, and/or processes described herein. It should be noted that the memory 106 represents one suitable implementation of such computer-readable media, and alternatively or additionally, the server 102 could receive and cooperate with external computer-readable media that is realized as a portable or mobile component or application platform, e.g., a portable hard drive, a USB flash drive, an optical disc, or the like.

The application platform 110 is any sort of software application or other data processing engine that generates the virtual applications 128 that provide data and/or services to the client devices 140. In a typical embodiment, the application platform 110 gains access to processing resources, communications interfaces and other features of the processing hardware 104 using any sort of conventional or proprietary operating system 108. The virtual applications 128 are typically generated at run-time in response to input received from the client devices 140. For the illustrated embodiment, the application platform 110 includes a bulk data processing engine 112, a query generator 114, a search engine 116 that provides text indexing and other search functionality, and a runtime application generator 120. Each of these features may be implemented as a separate process or other module, and many equivalent embodiments could include different and/or additional features, components or other modules as desired.

The runtime application generator 120 dynamically builds and executes the virtual applications 128 in response to specific requests received from the client devices 140. The virtual applications 128 are typically constructed in accordance with the tenant-specific metadata 138, which describes the particular tables, reports, interfaces and/or other features of the particular application 128. In various embodiments, each virtual application 128 generates dynamic web content that can be served to a browser or other client program 142 associated with its client device 140, as appropriate.

The runtime application generator 120 suitably interacts with the query generator 114 to efficiently obtain multi-tenant data 132 from the database 130 as needed in response to input queries initiated or otherwise provided by users of the client devices 140. In a typical embodiment, the query generator 114 considers the identity of the user requesting a particular function (along with the user's associated tenant), and then builds and executes queries to the database 130 using system-wide metadata 136, tenant specific metadata 138, pivot tables 134, and/or any other available resources. The query generator 114 in this example therefore maintains security of the common database 130 by ensuring that queries are consistent with access privileges granted to the user and/or tenant that initiated the request. In this manner, the query generator 114 suitably obtains requested subsets of data 132 accessible to a user and/or tenant from the database 130 as needed to populate the tables, reports or other features of the particular virtual application 128 for that user and/or tenant.

Still referring to FIG. 1, the data processing engine 112 performs bulk processing operations on the data 132 such as uploads or downloads, updates, online transaction processing, and/or the like. In many embodiments, less urgent bulk processing of the data 132 can be scheduled to occur as processing resources become available, thereby giving priority to more urgent data processing by the query generator 114, the search engine 116, the virtual applications 128, etc.

In exemplary embodiments, the application platform 110 is utilized to create and/or generate data-driven virtual applications 128 for the tenants that they support. Such virtual applications 128 may make use of interface features such as custom (or tenant-specific) screens 124, standard (or universal) screens 122 or the like. Any number of custom and/or standard objects 126 may also be available for integration into tenant-developed virtual applications 128. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system. For example, a virtual CRM application may utilize standard objects 126 such as "account" objects, "opportunity" objects, "contact" objects, or the like. The data 132 associated with each virtual application 128 is provided to the database 130, as appropriate, and stored until it is requested or is otherwise needed, along with the metadata 138 that describes the particular features (e.g., reports, tables, functions, objects, fields, formulas, code, etc.) of that particular virtual application 128. For example, a virtual application 128 may include a number of objects 126 accessible to a tenant, wherein for each object 126 accessible to the tenant, information pertaining to its object type along with values for various fields associated with that respective object type are maintained as metadata 138 in the database 130. In this regard, the object type defines the structure (e.g., the formatting, functions and other constructs) of each respective object 126 and the various fields associated therewith.

Still with reference to FIG. 1, the data and services provided by the server 102 can be retrieved using any sort of personal computer, mobile telephone, tablet or other network-enabled client device 140 on the network 145. In an exemplary embodiment, the client device 140 includes a display device, such as a monitor, screen, or another conventional electronic display capable of graphically presenting data and/or information retrieved from the multi-tenant database 130. Typically, the user operates a conventional browser application or other client program 142 executed by the client device 140 to contact the server 102 via the network 145 using a networking protocol, such as the hypertext transport protocol (HTTP) or the like. The user typically authenticates his or her identity to the server 102 to obtain a session identifier ("SessionID") that identifies the user in subsequent communications with the server 102. When the identified user requests access to a virtual application 128, the runtime application generator 120 suitably creates the application at run time based upon the metadata 138, as appropriate. As noted above, the virtual application 128 may contain Java, ActiveX, or other content that can be presented using conventional client software running on the client device 140; other embodiments may simply provide dynamic web or other content that can be presented and viewed by the user, as desired.

A data item, such as a knowledge article, stored by one tenant (e.g., one department in a company) may be relevant to another tenant (e.g., a different department in the same company. One way of providing a user in another tenant domain with access to the article is to store a second instance of the article in the tenant domain of the second tenant. The apparatus, systems, techniques and articles described herein provide another way of providing a user in another tenant domain with access to the article without wasting resources by storing a second copy.

Figure 2:
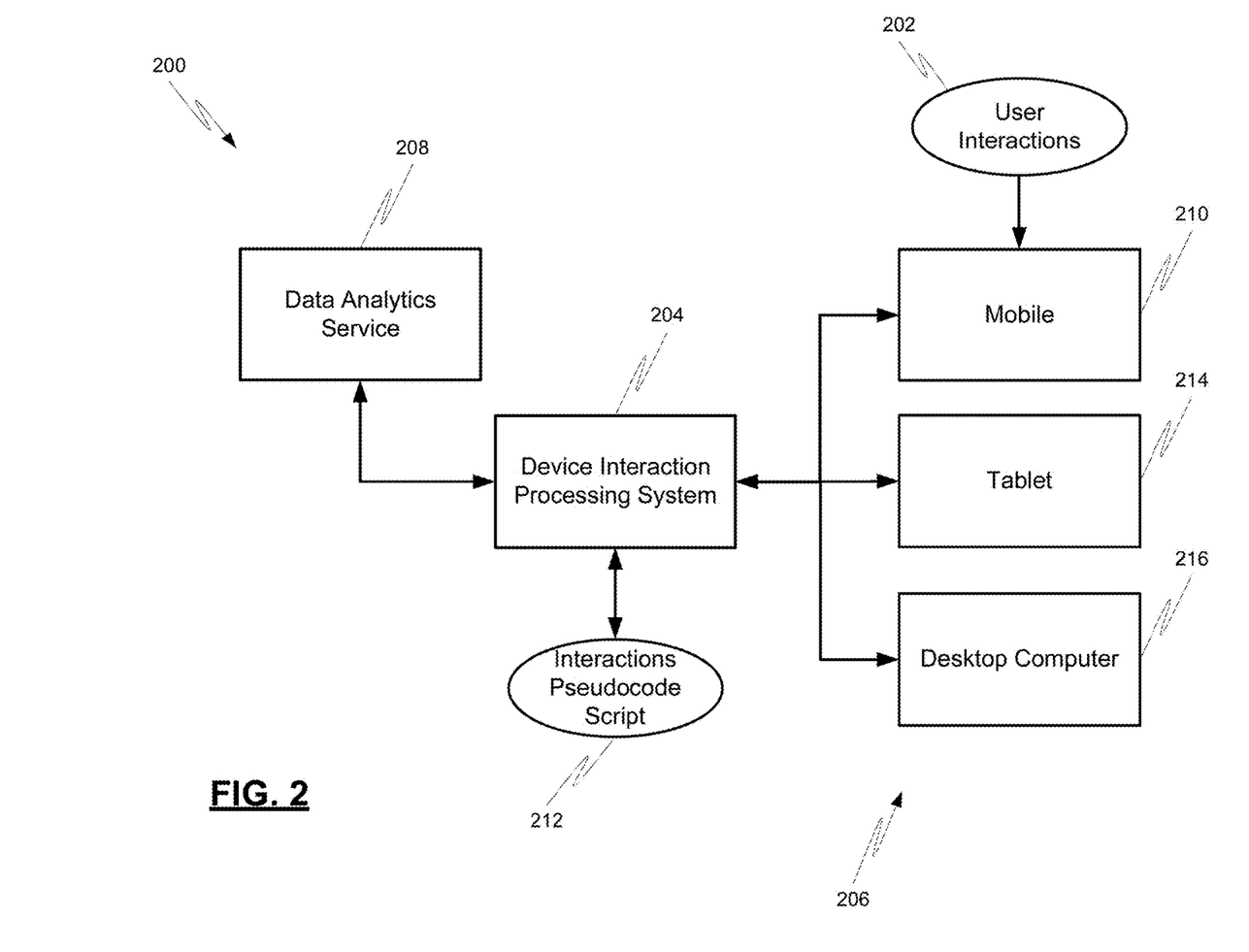
FIG. 2 is a block diagram depicting an exemplary embodiment of a system for capturing user interactions.

FIG. 2 depicts at 200 a system for capturing user interactions 202 with one or more software programs. A device interaction processing system 204 processes the user interactions so that they can be visually replayed on other devices 206. For example, a user may be interacting with a data analytics service 208 on a mobile phone 210 to analyze how productive a software testing project has been over the last three months. The user interactions 202 can specify input data sets for the analysis, the type of statistical analysis to be performed, and how the results should be displayed to the user.

The device interaction processing system 204 not only captures user interactions 202 with the data analytics service 208 but also transforms the data into a format that can be visually replayed on different types of devices. The format can be in the form of pseudocode script 212 that represents the user interactions 202 in a device agnostic manner. This allows the interactions to be replayed on different types of devices, thereby saving a user from expending time repeating the same or similar type of data analytic actions on the other devices 214 and 216. Further, this reduces possible errors when the user is attempting to repeat the operations at a subsequent time.

In this example, user interactions 202 were originally performed on a mobile smart phone 210 for replaying on different devices 214 and 216. The different devices 214 and 216 can include network-enabled devices, wireless mobile communications devices, mobile computing platforms, mobile accessories (e.g., smart watches, smart glasses, etc.), smart appliances, tablets, personal computers, desktop computers, laptop computers, etc. They can operate within diverse architectures such as client-server systems, multi-tenant on-demand data systems, etc.

Figure 3:
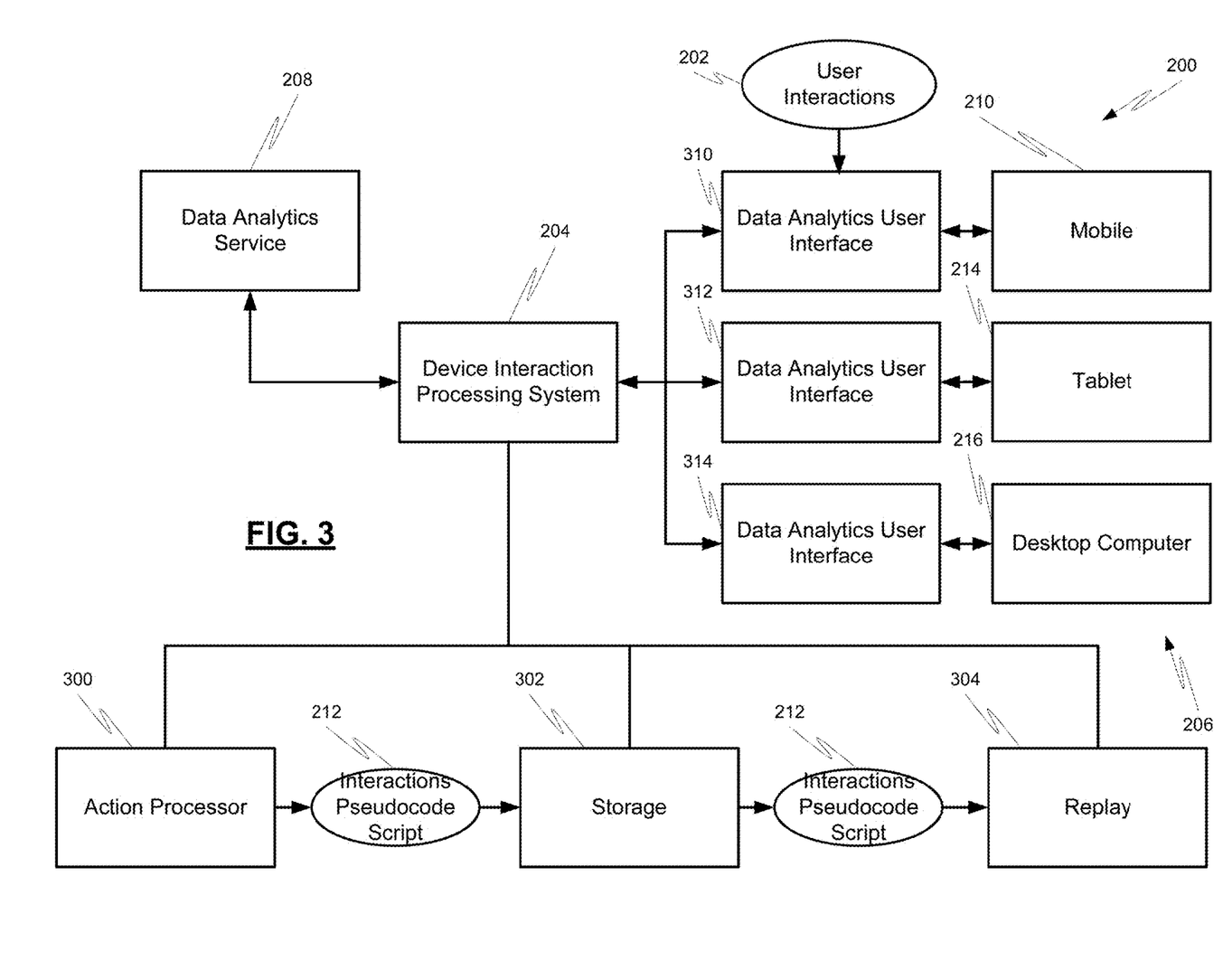
FIG. 3 is a block diagram depicting an exemplary embodiment of a system that detects and captures user interactions.

FIG. 3 depicts that the device interaction processing system 204 contains an action processor 300 for listening for user interactions 202 on device 210 and capturing any user interactions 202 as device agnostic actions. It should be understood that any type of user interaction (e.g., mouse click, keyboard entry, etc.) and information provided by the user can be captured. This can include textual or numerical information that is provided as criteria input for filtering data results, a title for a statistical metrics report, etc.

User interactions 202 can be captured as device agnostic actions because the interactions 202 are captured on the interface 312 using a scripting language that interfaces 312 and 314 on other devices 214 and 216 can also process.

Action processor 300 stores commands associated with the user interactions 202 by abstracting the commands into pseudocode script 212. The commands are captured in a scripting language, such as a scripting language that can be used with a multi-tenant data analytics service. An example of user interaction commands expressed as pseudocode script is a script containing a sequence of statements that are made up of keywords (such as filter, group, and order), identifiers, literals, or special characters for specifying how a user interacts with a user interface. The following contain example script commands:

Load 'DataSetName',
 Action click on the Filter # datasetid.filterid
 Action type 'Account name==10'
 Action group by age.

For example, a user can access a data analytics service for visualizing data analysis results on the mobile device 210. Once the mobile device 210 is in a script recording mode, any user interaction performed on the user interface 310 is detected and captured by the action processor 300 and is stored in storage device 302. Storage device 302 can be in-memory, disk, etc., along with metadata for providing information about the recording. Metadata can include:

Device name: IoS santhosh
OS: IoS
form factor: Iphone 6S, IPad . . . etc

A replay processor 304 handles the transmission of scripts to the other devices 206 such as over a communication channel shared by the devices.

The pseudocode script can be stored in a human or machine readable format. In one embodiment, the action processor 300 can store user interactions in a device agnostic manner by using a standard object framework, such as the business platform object (BPO) framework provided by Salesforce.com. A BPO framework allows objects to be created through standard template entities that can be used on different platforms. The creation of a platform entity may only need the use of pseudocode script to detail behavior within the BPO platform, thereby avoiding the need to write device-specific code for each platform (e.g., device). In one embodiment, a pseudocode script entity for use in a script may be dynamically and automatically created by the action processor 300. An example of a BPO framework being used to capture user interactions as entities for use in creating scripts includes SystemInfo:

| ID | OS | FormFactor |
|---|---|---|
| 001 | IoS | Iphone 6s |
| 002 | Mac | Desktop 1900 × 1200 |

Script BPO

| User | LastModifiedBy | Created Date | Pseudo-Script | SystemInfoForeign Id |
|---|---|---|---|---|
| Santosh | Dec. 6, 2018 | Jan. 6, 2018 | Load 'DataSetName', Action click on the Filter #datasetid.filterid Action type 'Account name == 10' Action group by age. | 001 |

Figure 4:
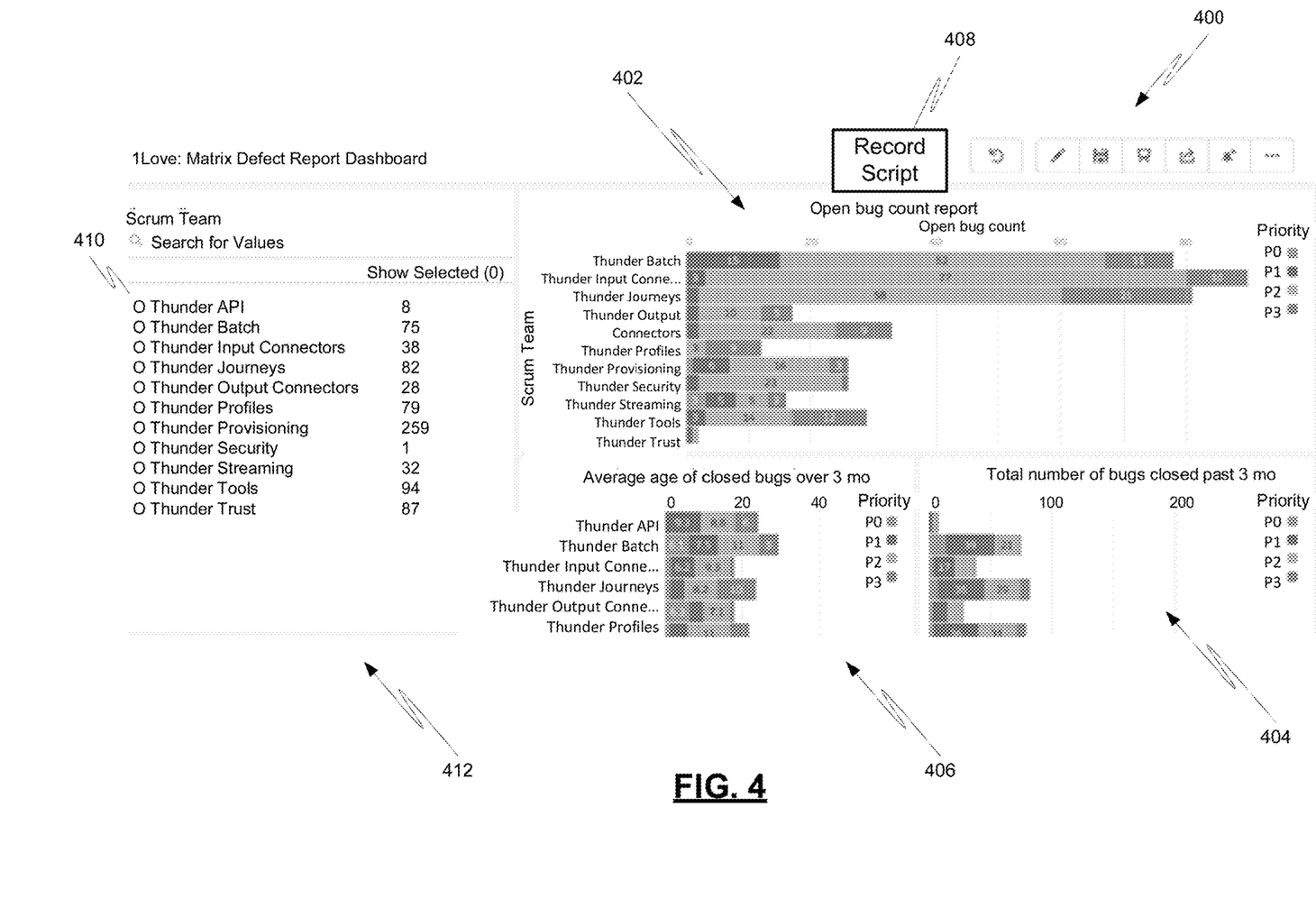
FIG. 4 is a user interface display depicting an exemplary embodiment of a dashboard where user interactions are to be captured.

The user interfaces 310, 312, and 314 in FIG. 4 can handle data analytics queries and results through lenses. A lens describes a single data visualization, such as a query with chart options for rendering the query. A user can select filters to change query parameters and can choose different display options, such as a bar chart, pie chart or scatter plot, which triggers a real-time change to the display panel using the updated filter options.

The user interfaces 310, 312, and 314 can also use dashboards for displaying multiple lenses as real-time data query results. For example, an analyst can arrange lenses for displaying multiple sets of query results from the data analytics service 208 on a single dashboard. Live query results are produced and displayed across the lenses on the dashboard. In one embodiment, the dashboards are configured to directly interpret script commands for visualizing any user interactions contained in the device agnostic commands of a script.

FIG. 4 depicts at 400 a dashboard through which user interactions are to be captured and visually replayed on other devices. The dashboard 400 displays metrics related to software defects found in a software product. For example, the dashboard 400 provides information within interface region 402 for how many software defects or bugs remain unresolved, information within interface region 404 for how many bugs have been addressed, and information within interface region 406 regarding the amount of time it took to address the software defects. A user can select one of the software components within interface region 412 to view specific metrics about the selected software component.

The user initiates a user interaction capturing session by selecting the record script button 408 on the dashboard 400. In this example, the user wishes to view more detailed information about the "Thunder API" (application program interface). Thunder is a collection of tools for analyzing time series data. To view additional information about the API, the user selects control button 410 associated with Thunder API. In response, the user selection of control button 410 is captured as the user's first action. After selection of control button 410, the Thunder API metrics are displayed on a dashboard as shown at 500 in FIG. 5.

Figure 5:
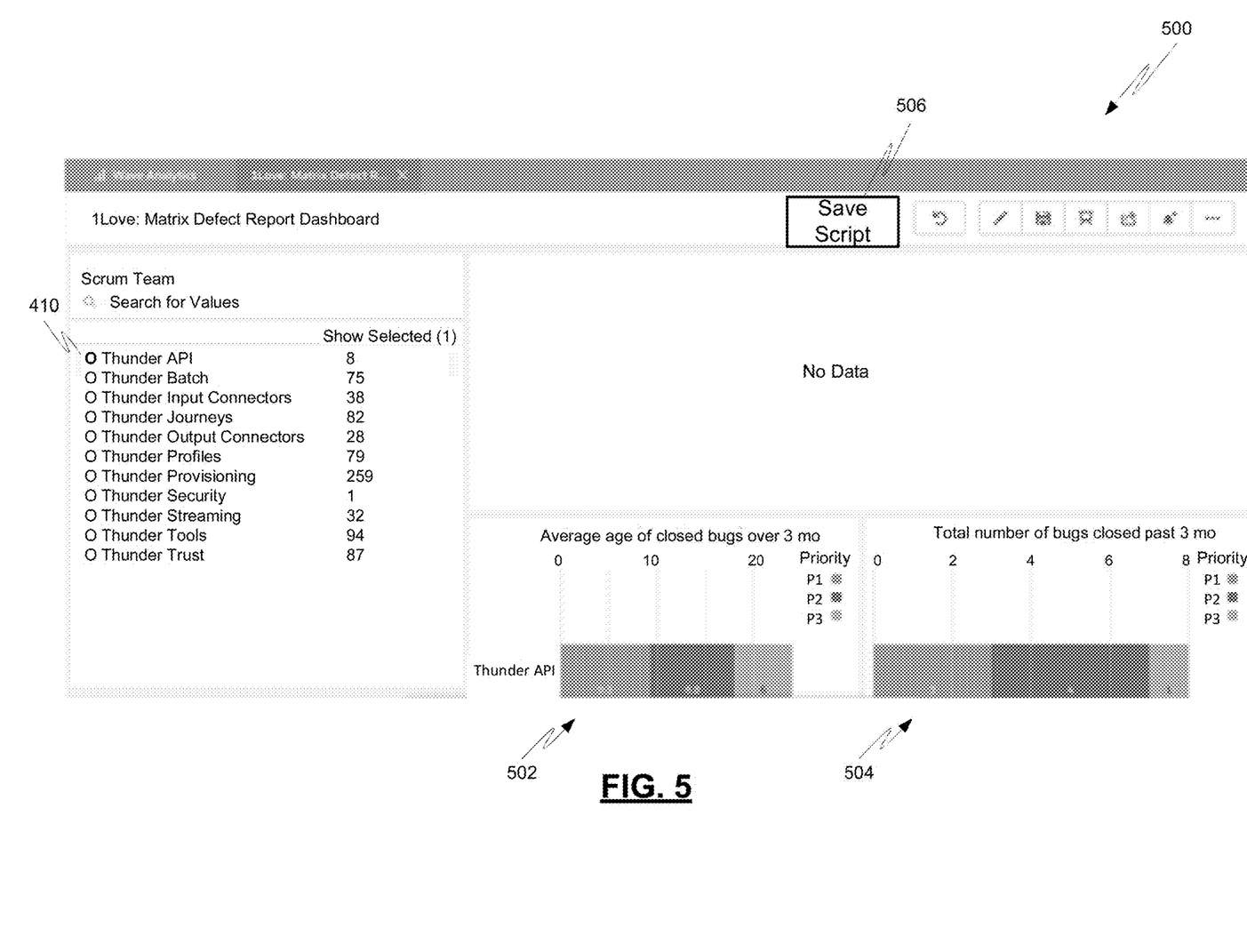
FIG. 5 is a user interface display depicting an exemplary embodiment of visualization of data analytic metrics.

With reference to FIG. 5, dashboard 500 contains metrics for the Thunder API. Chart 502 depicts Thunder API metrics related to the average age of closed bugs over the past three months. Chart 504 depicts Thunder API metrics related to the total number of bugs closed over the past three months. Any user interactions with the dashboard 500 are captured for replaying on other devices until control button 506 is activated. Activation of control button 506 allows the user to stop recording user interactions and save the user interactions as a script. In this way, user interactions are captured on a per user session basis. Before the session is terminated in this example, the user performs a second action that results in opening the lens associated with chart 502 in a new window.

Figure 6:
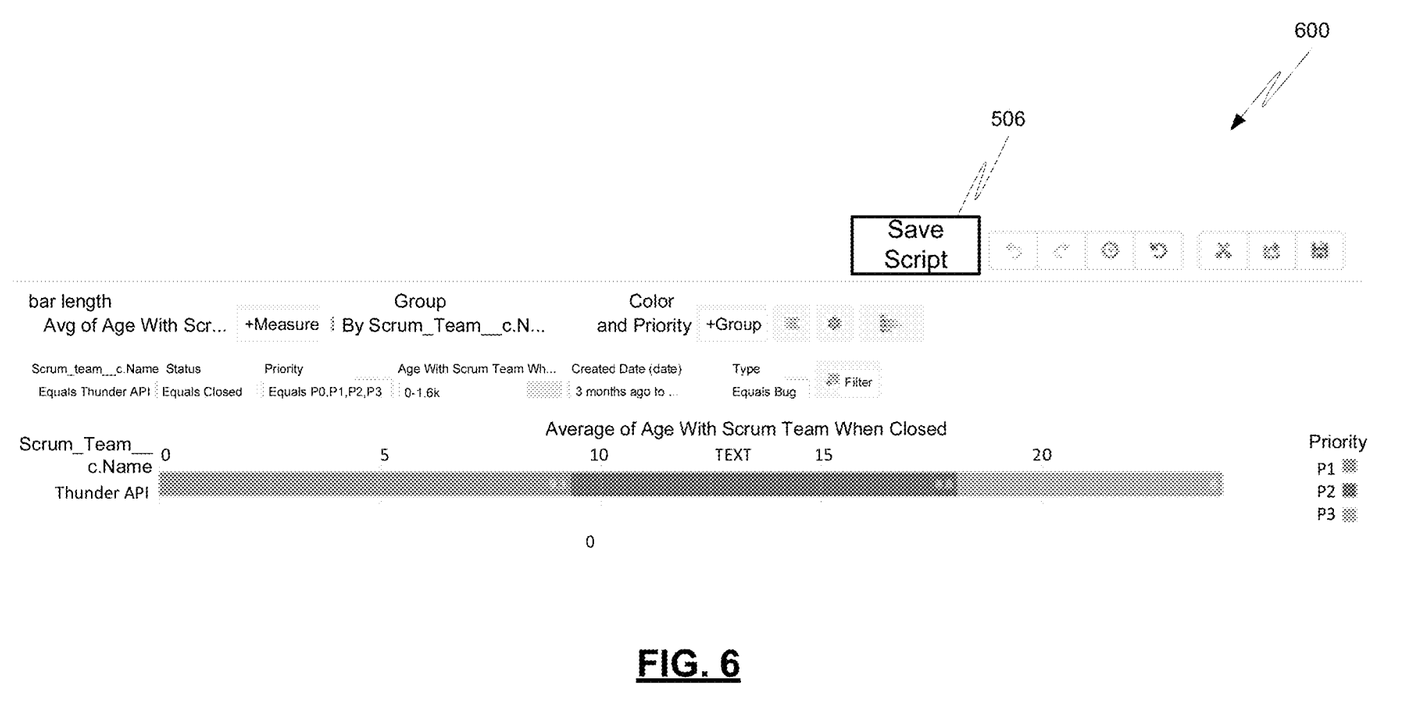
FIG. 6 is a user interface display depicting an exemplary embodiment of additional metrics resulting from a user's action.

FIG. 6 depicts at 600 the results of the user's second action which was to open the lens associated with the average age of closed bugs over the past three months broken down by the priority of the bug. When the user clicks the save script control button 506, the recording stops and the user actions are saved. For example, the captured user interactions can be saved in-memory, as a file on a server, etc. The user can share the stored user actions with other devices that are operated by the user or other users, such as through email, communication channels and dashboards provided by a multi-tenant database environment, etc.

Figure 7:
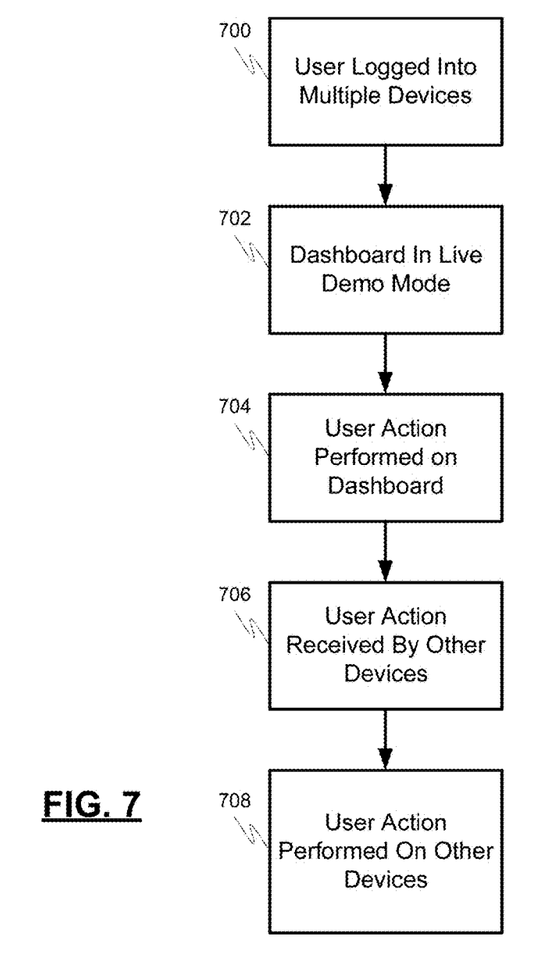
FIG. 7 is a flow chart depicting an operational scenario involving multiple devices receiving user actions through a data analytics interface.

FIG. 7 depicts an example operational scenario where multiple devices can receive user actions in real time. At process block 700, the same user is logged into multiple devices. For example, the user can be logged into a smart phone, a tablet, and a desktop computer. On one device, such as the smart phone, the user invokes a dashboard and places it into a live demonstration (demo) mode at process block 702. All of the other devices which the user is logged into will receive a notification to accept the live demo request so that they themselves can be placed into a mode to replay in real time the user actions originally performed on the smart phone.

At process block 704, the user performs an action on the dashboard of the smart phone. The user action is captured and stored at least temporarily in a device agnostic manner so that the user action can be sent to the other devices. At process block 706, the user action is received by the other devices and visually replicated at process block 708 on these devices.

In this manner, live dashboards can be shared in real-time with other devices so that any actions can be replayed to recreate the user interface visualizations on the other devices. Additionally, the user actions can be communicated to the other devices through many different communication mechanisms. For example, the messages from the smart phone's user interface is sent in this scenario over a common communication channel. If the user clicked on the Thunder API control button, a message with the user action formatted in a device agnostic manner is sent through the common communication channel to the other devices that are listening on that channel. Upon receipt of the message, the other devices implement the user action on their own respective dashboards. The devices continue to monitor the channel for any additional user interactions that are performed on the smart phone. The demo mode ends in this operational scenario when the user activates the stop recording button. The other devices receive a message that the demo mode has ended, and the other devices leave the demo mode. This scenario illustrates that data visualizations can be sent to other devices without having to navigate the page to a data analytics service, which means that devices listening to the channel automatically move to the dashboard page when the device accepts the demo mode notification, and once the demo is done, the app will resume what it was doing previously.

Figure 8:
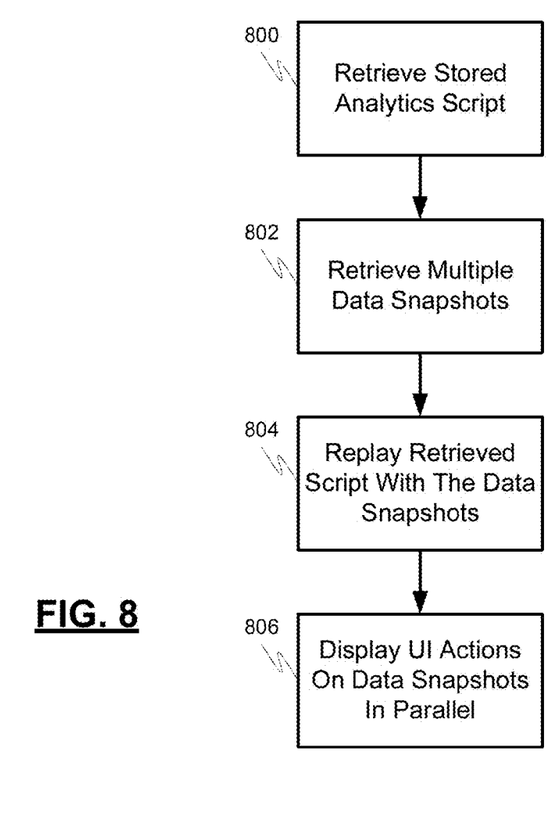
FIG. 8 is a flow chart depicting an operational scenario involving different snapshots of analytical data being visually replayed.

FIG. 8 depicts an example operational scenario for replaying two different snapshots of analytical data. At process block 800, an analytics script that had previously been recorded is retrieved. The analytics script can constitute many different types of captured user interactions to perform data analytic operations, such as user interactions that result in displaying a series of software testing and performance metrics.

At process block 802, the user selects two or more data snapshots. In this operational scenario, the data snapshots could be the raw, underlying data associated with how a software program performed during the testing phase. At process block 804, the retrieved script is used to replay the originally captured user interactions but this time upon the new data snapshots. At process block 806, with the same script running across the snapshots of data in parallel, the animations (e.g., the user interactions and display results) are displayed in parallel in order to compare the data patterns across their time stamps. In this way, auto playback of saved user actions can be performed across multiple devices.

Figure 9:
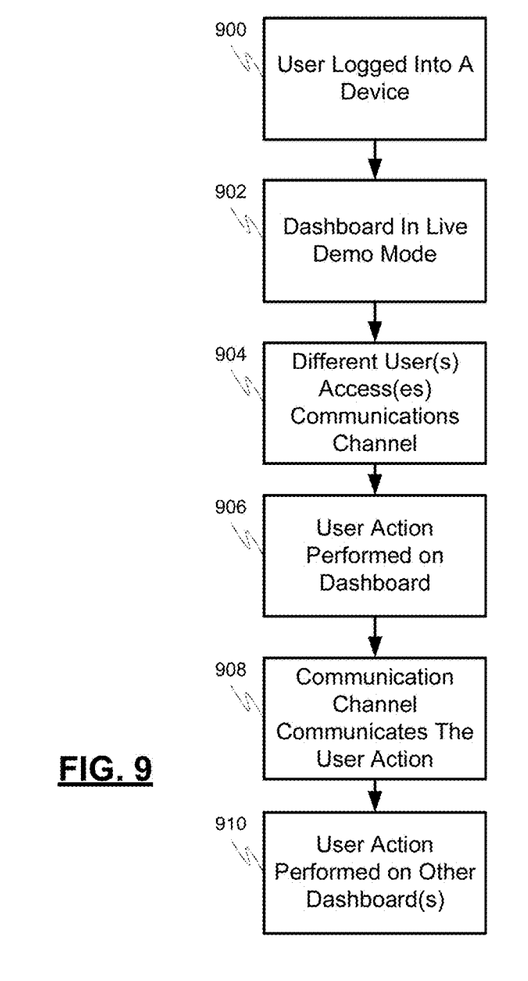
FIG. 9 is a flow chart depicting an operational scenario involving different users visualizing a user's actions through a data analytics interface.

FIG. 9 depicts an example operational scenario where different users can receive another user's actions in real time. At process block 900, a user is logged into a device, such as a smart phone, tablet, desktop computer, etc. On the device, the user invokes a dashboard and places it into a live demonstration (demo) mode at process block 902.

At process block 904, a different user accesses the communication channel that is configured to transmit the captured user interactions in a device agnostic format to other dashboards. At process block 906, the first user performs an action on the dashboard. The user action is captured and stored at least temporarily so that the user action can be sent to other devices through the common communication channel at process block 908. The user action is received by the other devices and visually replicated at process block 910 on the other devices. In this manner, live dashboards can be shared over a channel in real-time with other users so that any actions can be replayed on their devices. Further, it should be understood that different users can also replay a stored script at a later time.

The foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary embodiments described herein are not intended to limit the scope or applicability of the subject matter in any way.

For the sake of brevity, conventional techniques related to object models, web pages, multi-tenancy, cloud computing, on-demand applications, and other functional aspects of the systems (and the individual operating components of the systems) may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first," "second" and other such numerical terms do not imply a sequence or order unless clearly indicated by the context.

Embodiments of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processing systems or devices can carry out the described operations, tasks, and functions by manipulating electrical signals representing data bits at accessible memory locations, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any non-transitory medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like. In this regard, the subject matter described herein can be implemented in the context of any computer-implemented system and/or in connection with two or more separate and distinct computer-implemented systems that cooperate and communicate with one another. In one or more exemplary embodiments, the subject matter described herein is implemented in conjunction with a virtual customer relationship management (CRM) application in a multi-tenant environment.

While at least one exemplary embodiment has been presented, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this document. Accordingly, details of the exemplary embodiments or other limitations described above should not be read into the claims absent a clear intention to the contrary.

What is claimed:

1. A method for providing visualizations across devices of user interactions with a data analytics service, comprising:
   detecting, by one or more data processors, the user interactions with a data analytics user interface on a first device, the user interactions being related to performing data analytics operations on the first device;
   generating, by the one or more data processors, device agnostic commands as metadata and pseudocode script for performing the data analytics operations on a second device, wherein the metadata contains the device agnostic commands and device operating environment information, wherein the pseudocode script is a script containing a sequence of statements that are created based upon objects from a platform object framework, wherein the pseudocode script includes parameters associated with the individual statements, and wherein the parameters include data set name for loading, filter identifier for filtering data, and group-by data;
   storing the device agnostic commands as a script in a computer-implemented storage device; and
   transmitting to a second device the stored device agnostic commands for replicating the detected user interactions on a data analytics user interface on the second device, the second device being a different type of processor-implemented device than the first device, wherein the different type of processor-implemented device includes the second device using a different type of operating environment.

2. The method of claim 1, the first device and second device being two different types of devices, wherein types of devices are selected from a group that includes mobile computing platforms, mobile accessories, desktops, and tablets, wherein the different type of operating environment includes the second device using a different type of operating system than the first device.

3. The method of claim 1 further comprising:
   generating device agnostic commands as metadata and pseudocode script that indicate information provided to the data analytics service through the detected user interactions; and
   storing the device agnostic commands using pseudocode script in in-memory or a non-volatile memory for transmitting to the second device.

4. The method of claim 1 further comprising:
   generating device agnostic commands as metadata and pseudocode script that indicate selection of user interface controls on the user interface of the first device;
   activating a start recording button to initiate the detecting of the user interactions; and
   activating a stop recording button to cease the detecting of the user interactions.

5. The method of claim 1 further comprising:
   transmitting over a common communication channel the stored device agnostic commands to the second device, the second device being associated with a user that is different than a user associated with the first device.

6. The method of claim 1 further comprising:
   transmitting over a common communication channel the stored device agnostic commands to the second device, the second device being associated with a user that is the same as the user associated with the first device.

7. The method of claim 1 further comprising:
   simultaneously replaying the stored device agnostic commands on different data sets in parallel for comparison analysis.

8. The method of claim 1, the transmitting being configurable to allow sharing of the stored device agnostic commands with other devices whose user interfaces are configurable to process directly the transmitted device agnostic commands.

9. The method of claim 8, the transmitted device agnostic commands being transmitted through a shared feed provided on the communication channel to which the other devices navigate;
   the transmitted device agnostic commands being provided for automatic playback of the user interactions on the other devices.

10. A system comprising a hardware processor and non-transient computer readable media coupled to the processor for providing visualizations across devices of user interactions with a data analytics service, the non-transient computer readable media comprising instructions configurable to be executed by the processor to:
    detect the user interactions with a data analytics user interface on a first device, the user interactions being related to performing data analytics operations on the first device;
    generate device agnostic commands as metadata and pseudocode script for performing the data analytics operations on a second device, wherein the metadata contains the device agnostic commands and device operating environment information, wherein the pseudocode script is a script containing a sequence of statements that are created based upon objects from a platform object framework, wherein the pseudocode script includes parameters associated with the individual statements, and wherein the parameters include data set name for loading, filter identifier for filtering data, and group-by data;

store the device agnostic commands as a script in a computer-implemented storage device; and transmit to a second device the stored device agnostic commands for replicating the detected user interactions on a data analytics user interface on the second device, the second device being a different type of processor-implemented device than the first device, wherein the different type of processor-implemented device includes the second device using a different type of operating environment.

11. The system of claim 10, wherein the first device and second device are two different types of devices, wherein types of devices are selected from a group that includes mobile computing platforms, mobile accessories, desktops, and tablets, wherein the different type of operating environment includes the second device using a different type of operating system than the first device.

12. The system of claim 10, wherein the computer-implemented storage device stores the device agnostic commands as metadata and pseudocode script that indicate information provided to the data analytics service through the detected user interactions;

wherein the device agnostic commands using pseudocode script are stored in in-memory or a non-volatile memory for transmitting to the second device.

13. The system of claim 10, wherein the computer-implemented storage device stores generating device agnostic commands as metadata and pseudocode script that indicate selection of user interface controls on the user interface of the first device;

wherein the instructions configurable to be executed by the processor further comprise:

generating a start recording button to initiate the detecting of the user interactions; and generating a stop recording button to cease the detecting of the user interactions.

14. The system of claim 10, wherein the second device is associated with a user that is different than a user associated with the first device.

15. The system of claim 10, wherein the second device is associated with a user that is the same as the user associated with the first device.

16. The system of claim 10, the transmitting being configurable to allow sharing of the stored device agnostic commands with other devices whose user interfaces are configurable to process directly the transmitted device agnostic commands.

17. The system of claim 16, the transmitted device agnostic commands being transmitted through a shared feed provided on the communication channel to which the other devices navigate;

the transmitted device agnostic commands being provided for automatic playback of the user interactions on the other devices.

18. A non-transient computer readable storage media comprising computer instructions configurable to be executed by a hardware processor to cause a data analytics system to implement a method comprising:

detecting, by one or more data processors, the user interactions with a data analytics user interface on a first device, the user interactions being related to performing data analytics operations on the first device;

generating, by the one or more data processors, device agnostic commands as metadata and pseudocode script for performing the data analytics operations on a second device, wherein the metadata contains the device agnostic commands and device operating environment information, wherein the pseudocode script is a script containing a sequence of statements that are created based upon objects from a platform object framework, wherein the pseudocode script includes parameters associated with the individual statements, and wherein the parameters include data set name for loading, filter identifier for filtering data, and group-by data;

storing the device agnostic commands as a script in a computer-implemented storage device; and transmitting to a second device the stored device agnostic commands for replicating the detected user interactions on a data analytics user interface on the second device, the second device being a different type of processor-implemented device than the first device, wherein the different type of processor-implemented device includes the second device using a different type of operating environment.

* * * * *